April 4, 1939.  L. D. GOFF ET AL  2,153,117

CONDENSATE RETURN SYSTEM

Filed June 22, 1936

Inventor

Leonard D. Goff
Rollo O. Monroe

By Beaman & Langford
Attorney

UNITED STATES PATENT OFFICE 2,153,117

CONDENSATE RETURN SYSTEM

Leonard D. Goff and Rollo O. Monroe, Three Rivers, Mich., assignors to The Johnson Corporation, Three Rivers, Mich., a corporation of Michigan Application June 22, 1936, Serial No. 86,479

1 Claim. (Cl. 137—103)

This invention relates to traps and more particularly to a system for collecting steam condensate and returning it to the generating boiler.

In the patent to Goff, No. 2,011,626, there is disclosed a system for returning steam condensate to the generating boiler from a trap below the boiler in which the pressure in the trap was equalized with that in the boiler and pumped against merely the head corresponding to the distance between the level of the water in the boiler and the level of the condensate in the trap. The present invention is an improvement to the patented system disclosed in the above mentioned patent and, briefly, comprises the venting of the trap of said patented system to a condensate receiving condenser tank whereby the steam vented to the receiving condenser tank condenses and creates a vacuum which is effective on the line which flows into the receiver.

An object of the invention is to provide a system wherein vented steam from a trap is condensed to create a vacuum in a return line flowing to the trap.

Another object of the invention is to vent a trap to a receiving condenser tank into which condensate is returned before flowing to the trap.

These and other objects will be apparent from the specification when taken with the accompanying drawing in which—

Figures 1, 2, 3:
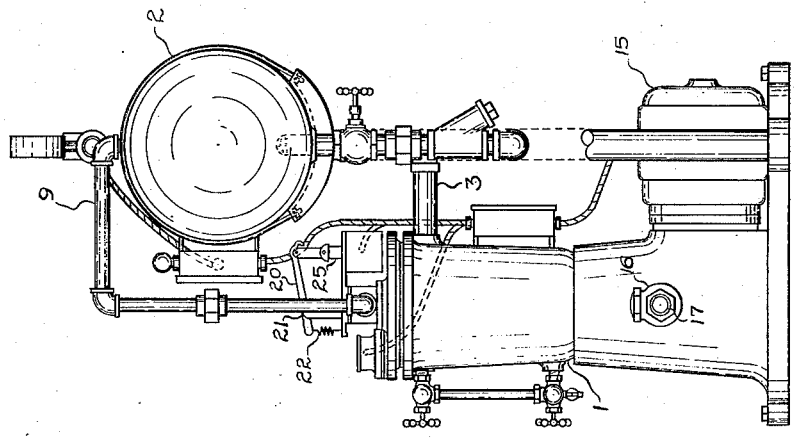
Fig. 1 is a side elevation of the receiving condenser tank and trap.
Fig. 2 is an end elevation of the same.
Fig. 3 is a diagrammatic illustration of the electric controlling circuit and the system according to the invention.

Referring particularly to the drawing the reference character 1 indicates a trap. The trap 1 although operated electrically instead of mechanically functions in the same manner as the trap disclosed in the aforementioned patent. Condensate is admitted to the trap 1 from the receiving condenser tank 2 through the pipe 3 and check valve 4. The pipe 3 extends upwardly from the bottom of the receiving condenser tank 2 in order that there shall always be a predetermined volume of water in the receiving condenser tank 2 to hasten condensation. A baffle 5 is disposed within the trap 1 opposite the condensate entrance to direct condensate downwardly and prevent its flowing on to the electrodes 6 and 7 constituting a portion of the valve operating mechanism of the trap. The trap 1, while condensate is flowing thereinto is vented through a valve 8, pipe 9, and check valve 10 to the receiving condenser tank 2. At the same time a pipe 11 providing communication between the steam generating boiler, not shown, and the trap 1, to equalize the pressure in the boiler and the trap 1 is closed by means of a valve 12. The steam valve 12 and the vent valve 8 are connected for simultaneous operation so that when one is opened the other is closed and vice versa.

The condensate is removed from the trap 1 by an electric motor driven centrifugal pump 15. Condensate passes from the pump 15 through the check valve 16 and pipe 17 to the steam generating boiler.

The operation of the pump 15, and the steam valve 12 and vent valve 8 is controlled by the electrodes 6 and 7 and an electric circuit 18. Briefly described, the operation of the trap is such that when the condensate in the trap rises to contact the electrode 6 the circuit 18 operates to close the vent valve 8, to open the steam valve 12 and to operate the pump 15. As the result the pressure within the trap 1 is equalized with that in the boiler and the condensate is pumped back into the boiler against a head equal to the head of water between the level of the water in the boiler and the level of the water in the trap. When the condensate in the trap 1 falls below the level of the lower end of the electrode 7 the circuit 18 operates to stop the pump, close the steam valve 12 and open the vent valve 8.

The circuit 18 and apparatus for shifting the valves and starting and stopping the motor 15 is as follows:

The steam valve 12 and the vent valve 8 are mounted on a stem 19 pivoted to a walking beam 20 which is in turn pivoted between its ends to a fixed support 21. The end of the walking beam 20 opposite the support 21 from the stem 19 is downwardly urged by a spring 22 in such a manner as to yieldingly urge the vent valve 8 away from its seat 23 and to maintain the steam valve 12 against its seat 24. The opposite end of the walking beam 20 has pivoted thereto a plunger 25 partially disposed within the solenoid 26 in such a manner that when the solenoid 26 is energized the plunger 25 is drawn within it pivoting the walking beam 20 about its support 21 to open the steam valve 12 and to close the vent valve 8.

A source of electric power 30 is connected to the solenoid 26 by the conductors 31 and 32, the switch 33 and the conductor 34. The same source is connected to the motor driven centrifugal pump 15 by conductors 35, 36 and 32, the switch 33 and the conductor 34.

The switch 33 for controlling the solenoid 26 and motor driven centrifugal pump 15 is controlled by a relay 37. The relay 37 has a primary coil 38 about the end bar 39 of a core 40. The core 40 consists of not only the end bar 39 but also poles 41 and 42 and an intermediate core bar 43. One of the terminals of a secondary coil 44 around the intermediate core bar 43 is connected to the electrode 6 by a conductor 45 and the other terminal of the secondary 44 is connected to the body of the trap 1 by a conductor 46. When the condensate in the trap 1 is rising and is below the level of the electrode 6 which extends only a short distance down from the top of trap 1, the circuit including the secondary 44 is open. Under these conditions the current passing through the primary coil 38 sets up a magnetic flux in the end bar 39 of the core 40, which travels in an endless path through a portion of the poles 41 and 42 and through the intermediate core bar 43. When the condensate rises to the level of the electrode 6, the circuit consisting of the secondary coil 44, the conductors 45 and 46, the trap 1, the condensate within the trap 1, and the electrode 6, is closed which sets up a counter-magnetic flux in the core bar 43 due to the potential induced in the secondary coil 44 by the primary coil 38. The counter-magnetic flux produced by the secondary coil 44 diverts the primary magnetic flux along the entire length of the poles 41 and 42, which forcibly draws the armature 47 to the ends of the poles 41 and 42. The movement of the armature 47 is operative through the linkage 48 to close the switch 33. Thus as the condensate reaches the electrode 6, the motor driven centrifugal pump 15 is started and by energization of the solenoid 26 the steam valve 12 is opened and the vent valve 8 is closed. The steam admitted from the generating boiler through the valve 12 equalizes the pressure in the trap 1 with that in the generating boiler and the motor driven centrifugal pump 15 pumps the condensate from the trap 1 back into the generating steam boiler at a head equal only to that resulting from the difference in the level between the water level in the boiler and the condensate level in the trap.

The switch 33 also closes a holding circuit to continue the operation of the motor driven centrifugal pump 12 and to retain the steam valve 12 open and the vent valve 8 closed until the level of the condensate falls below the lower end of the electrode 7 which extends from the top of the trap 1 to a point adjacent its bottom. The holding circuit consists of the electrode 7, the conductor 49, the switch 33, the conductors 50 and 45, the secondary coil 44, the conductor 46, the trap 1 and the condensate within the trap 1. Thus when the level of the condensate falls below the lower end of the electrode 7 the holding circuit, which shorts the secondary 44 and maintains the switch 33 closed after the level of the condensate falls below the level of the electrode 6, will be opened permitting the primary magnetic flux to again pass through the core bar 43 to permit the armature 47 to drop away from the poles 41 and 42 with the resulting opening of the switch 33. When the switch 33 is opened the motor stops and the solenoid 26 becomes de-energized which permits the spring 22 to act on the walking beam 20 to open the vent valve 8 and to close the steam valve 12.

The opening of the vent valve 8 permits the steam under pressure in the trap 1 to vent through the valve 8, the pipe 9 and the check valve 10 to the receiving condenser tank 2 where it condenses creating a partial vacuum which is effective on the line 55 from which condensate is received, facilitating the return of condensate and increasing the efficiency of the system. It will be understood that condensate flowing into the trap 1 through the pipe 3 and check valve 4 will force steam remaining in the trap 1 through the vent valve 8 into the receiving condenser tank 2 and that steam may also condense within the trap 1 lowering the pressure therein and facilitating the flow of condensate to the trap 1.

The receiving condenser tank 2 is provided with a vent 56 having a check valve 57. The vent 56 is provided to permit the escape of steam which might be in excess under some conditions such as with the receiving condenser tank 2 partially full of condensate at the time of opening the vent valve 8. The check valve 57 in the vent 56 prevents the back flow of air into the receiving condenser tank 2 which would otherwise occur when the pressure in the receiving condenser tank 2 drops below atmospheric as a result of the condensation of the steam vented therein. It will be clear from the foregoing description that we have provided a system for utilizing the steam used to equalize the pressure of the trap and boiler during the emptying of the trap by condensing it to create a vacuum in the condensate receiving condenser tank which is effective on the line discharging into the receiving condenser tank. In operation the flow of condensate into the receiving condenser tank 2 is such that the frequency of the trap emptying cycles is sufficiently great to result in enough steam being vented in the receiving condenser tank 2 to be condensed to provide a vacuum. The system not only avoids the wasting of the steam used in equalizing the pressure in the trap and boiler but also results in an increase in the efficiency of operation due to the vacuum produced in the receiving condenser tank 2 and return line 55.

The electric circuit 18 and the apparatus for actuating the steam valve 12 and the vent valve 8 are to be considered merely for the purpose of illustration of our improved system and accordingly we do not wish to be limited except by the scope of the appended claim.

We claim:

A method of returning condensate to a boiler and creating a partial vacuum in the return line of a steam system, which comprises the steps of directing the condensate from the return line into an enlarged chamber, continuously discharging said condensate from said chamber into a second chamber, except during the period of discharge of said second chamber, so as to maintain a large vapor space therein of substantially constant volume, discharging condensate from said second chamber at intervals determined by the level therein into the boiler by mechanical pumping acting against the head between the boiler and said second chamber while steam is being directed at boiler pressure into said second chamber for equalizing the boiler pressure, and thereafter venting the exhaust steam from said second chamber into the vapor space of said first chamber, the venting into said first chamber and the admission of steam to said second chamber being mechanically effected independently of the source of steam pressure.

LEONARD D. GOFF.
ROLLO O. MONROE.